US006991350B2

(12) United States Patent
McInnis

(10) Patent No.: US 6,991,350 B2
(45) Date of Patent: Jan. 31, 2006

(54) HOUSING FOR AN LED FIXTURE AND SOFFIT LIGHTING SYSTEM UTILIZING THE SAME

(75) Inventor: Rodney McInnis, Gloucester (CA)

(73) Assignee: Delphitech Corporation, Ottawa (CA)

( * ) Notice: Subject to any disclaimer, the term of this patent is extended or adjusted under 35 U.S.C. 154(b) by 109 days.

(21) Appl. No.: 10/652,299

(22) Filed: Sep. 2, 2003

(65) Prior Publication Data

US 2004/0090785 A1 May 13, 2004

(30) Foreign Application Priority Data

Nov. 12, 2002 (CA) ............................................ 2411576

(51) Int. Cl.
*B60Q 3/04* (2006.01)

(52) U.S. Cl. ....................... 362/362; 362/218; 362/285; 362/353; 362/373; 362/430

(58) Field of Classification Search ................. 362/362, 362/218, 226, 285, 287, 345, 351, 353, 371, 362/373, 418, 427, 430
See application file for complete search history.

(56) References Cited

U.S. PATENT DOCUMENTS

| | | | | | |
|---|---|---|---|---|---|
| 3,388,246 | A | | 6/1968 | Bailey | |
| 4,075,882 | A | * | 2/1978 | Waldron | 374/1 |
| 4,156,270 | A | | 5/1979 | Beatty | |
| 4,160,285 | A | | 7/1979 | Shibla | |
| 4,480,809 | A | * | 11/1984 | Healey | 248/185.1 |
| 4,747,025 | A | | 5/1988 | Barton | |
| 4,774,643 | A | | 9/1988 | McGinnis et al. | |
| 4,814,953 | A | | 3/1989 | Distasio | |
| 4,858,083 | A | | 8/1989 | Wakimoto | |
| 4,881,156 | A | | 11/1989 | Shemitz et al. | |
| 4,947,291 | A | | 8/1990 | McDermott | |
| 4,967,330 | A | | 10/1990 | Bell et al. | |
| 5,077,645 | A | | 12/1991 | Habinak | |
| 5,086,379 | A | | 2/1992 | Denison et al. | |
| 5,161,879 | A | | 11/1992 | McDermott | |
| 5,191,264 | A | | 3/1993 | Hammond | |
| 5,581,956 | A | | 12/1996 | Fennessy et al. | |
| 5,599,091 | A | | 2/1997 | Kira | |
| 5,813,750 | A | | 9/1998 | Chou | |
| 6,065,853 | A | | 5/2000 | Crevier | |
| 6,260,983 | B1 | | 7/2001 | Chiu | |
| 6,315,432 | B1 | | 11/2001 | Kuo | |
| 6,412,973 | B1 | | 7/2002 | Bos et al. | |
| 6,540,374 | B2 | * | 4/2003 | Kira et al. | 362/153.1 |
| 6,676,278 | B2 | * | 1/2004 | Striebel et al. | 362/267 |
| 6,787,999 | B2 | * | 9/2004 | Stimac et al. | 315/51 |

FOREIGN PATENT DOCUMENTS

| | | |
|---|---|---|
| CA | 2 198 149 | 5/2002 |
| CA | 2 337 293 | 8/2002 |

* cited by examiner

*Primary Examiner*—John Anthony Ward
*Assistant Examiner*—Mark Tsidulko
(74) *Attorney, Agent, or Firm*—Hoffman Wasson & Gitler

(57) ABSTRACT

A housing for a light source, the housing having: an outer shroud, the outer shroud including an outer surface, a front edge, and a hollow inner surface; and an inner shroud, the inner shroud including a front edge and a concentric bore within which the light source is affixed, the inner shroud fitting concentrically within the inner surface of the outer shroud and the front edge of the inner shroud being offset back from the front edge of the outer shroud; wherein the radius between the outer edge of the concentric bore and the outer edge of the inner shroud shades the front edge of the outer shroud from the light source.

19 Claims, 9 Drawing Sheets

HOUSING FOR AN LED FIXTURE AND SOFFIT LIGHTING SYSTEM UTILIZING THE SAME

FIELD OF THE INVENTION

The present invention relates to housings for decorative lighting and for the application of these housings. In particular the present invention relates to discrete lighting fixtures for LED light sources, and the application thereof.

BACKGROUND TO THE INVENTION

Landscape lighting has become a specialized field in recent years in which experts require various types of lights in order to create the effect they are seeking. There are two primary purposes for landscape lighting: safety and beauty. Lighting can enhance the safety of a building by illuminating walkways and entrance ways, ensuring that a person can see obstacles, and removing some hiding areas for intruders.

Lighting further enhances the beauty of a building. Without lighting, a home and all of its architectural and landscaping details fade into the night. Lighting allows people to enjoy a building's features and landscaping even into the evening hours. Properly placed lighting adds curb appeal and creates a welcoming atmosphere for a home.

Various lighting systems exist, including post lights, lights mounted on walls around or over doorways. One such system is taught by U.S. Pat. No. 5,599,091 to Kira. These type of systems teach the use of incandescent or halogen illumination for walkways, doorways, or architectural or landscape features. However, these types of lighting systems have several drawbacks.

Lighting systems first need to be durable. A lighting system needs to be able to withstand years of variable weather, ranging from blistering heat to freezing cold, from high UV exposure from sunshine to moisture exposure from rain, snow and sleet. A quality lighting system cannot fail after only a few years due to materials.

Further, the use of incandescent or halogen bulbs also is problematic. These bulbs generate a significant amount of heat, restricting the type and size of the casing around these bulbs. Further, these bulbs have a relatively short life span, necessitating replacement. This can be both time consuming and dangerous if such lights are mounted in an elevated position such as on the soffit of a building.

Other lights which are within the art include recessed light fixtures that fit within a soffit of a building. An example of such a system is taught by U.S. Pat. No. 6,000,818 to Calouri. The problem with these type of systems is that they are not adjustable in the area which they light. These systems point straight down and create a cone of light under the fixture.

For landscape lighting a fixture should be adjustable. This first allows landscape or architectural features to be highlighted. Secondly, as elements change, such as when trees or bushes grow, it is desirable to adjust the lighting of these elements. The shortcoming of existing soffit solutions is that they do not allow this flexibility.

A third desirable feature of landscape lighting systems is that they be discrete. These systems should not draw attention to themselves during the day. For fixtures such as those illustrated in U.S. Pat. No. 5,999,091 to Kira, their size makes them difficult to hide or affix discretely.

Discrete lights are also important at night. A fixture should minimize glowing or drawing attention to itself. The problem with UV resistant plastics is that they transmit light. One possibility for preventing this is the use of an internal coating. However, internal coatings which would come to the inner edge of an outer shroud are more visible during the daytime, making the fixtures less discrete.

SUMMARY OF THE INVENTION

The present invention seeks to overcome the shortcomings of the prior art by providing a lighting system that can be mounted to soffits, walls or ceilings and that is compact and discrete. The system uses a light emitting diode (LED) light source, allowing smaller casings than landscape lighting currently in the art. The use of an LED further reduces power consumption and increases the longevity of the fixture.

The system further provides a shroud that is colored to camouflage the fixture against the soffit, wall or ceiling it is mounted to in order to reduce the visibility of the lighting system during the daytime. The shroud is comprised of durable UV resistant plastic.

At night, in order to reduce any glow of translucent shrouds, an inner shroud is provided that absorbs light directed sideways. This inner shroud is made of a dark plastic and has an inner diameter that is smaller than the outer diameter, providing a deep edge at the front of the inner shroud. The dark shroud can be offset from the front of the outer shroud, making it harder to see in the daytime. Also, at night the front of the outer shroud is in shadow of the inner shroud when the LED light source is lit, ensuring minimal glowing of the fixture.

The system further provides an illumination system wherein the light can be focused on a particular feature or element of the landscaping. The illumination system can also be redirected to other landscape features or to be more properly directed to a changing landscape feature by its adjustable nature when necessary.

The system further provides for heat dissipation to allow brighter, higher powered LEDs to be used. The heat dissipating system removes heat from the LED that might otherwise shorten the LED's life span an/or its brightness. Lower powered systems may further include a h at dissipation system to provide for manufacturing efficiencies and product consistencies for fixture systems with both low and high powered LEDs.

The present invention therefore provides a housing for a light source, said housing comprising: an outer shroud, said outer shroud including an outer surface, a front edge, and a hollow inner surface; and an inner shroud, said inner shroud including a front edge and a concentric bore, said inner shroud fitting concentrically within said inner surface of said outer shroud and said front edge of said inner shroud being offset back from the front edge of said outer shroud; wherein the radius between the outer edge of said concentric bore and the outer edge of said inner shroud shades said front edge of said outer shroud from said light source.

The present invention further provides a fixture for illuminating architectural and landscaping features of a property, said fixture comprising: a housing; a light emitting diode affixed within said housing; a power supplying means to provide power to said light emitting diode; and a mounting means for mounting said housing to a building; wherein said light emitting diode provides illumination for the architectural and landscaping features of the property.

BRIEF DESCRIPTION OF THE DRAWINGS

In drawings which illustrate by way of example only a preferred embodiment of the invention.

DETAILED DESCRIPTION OF THE DRAWINGS

Figure 1:
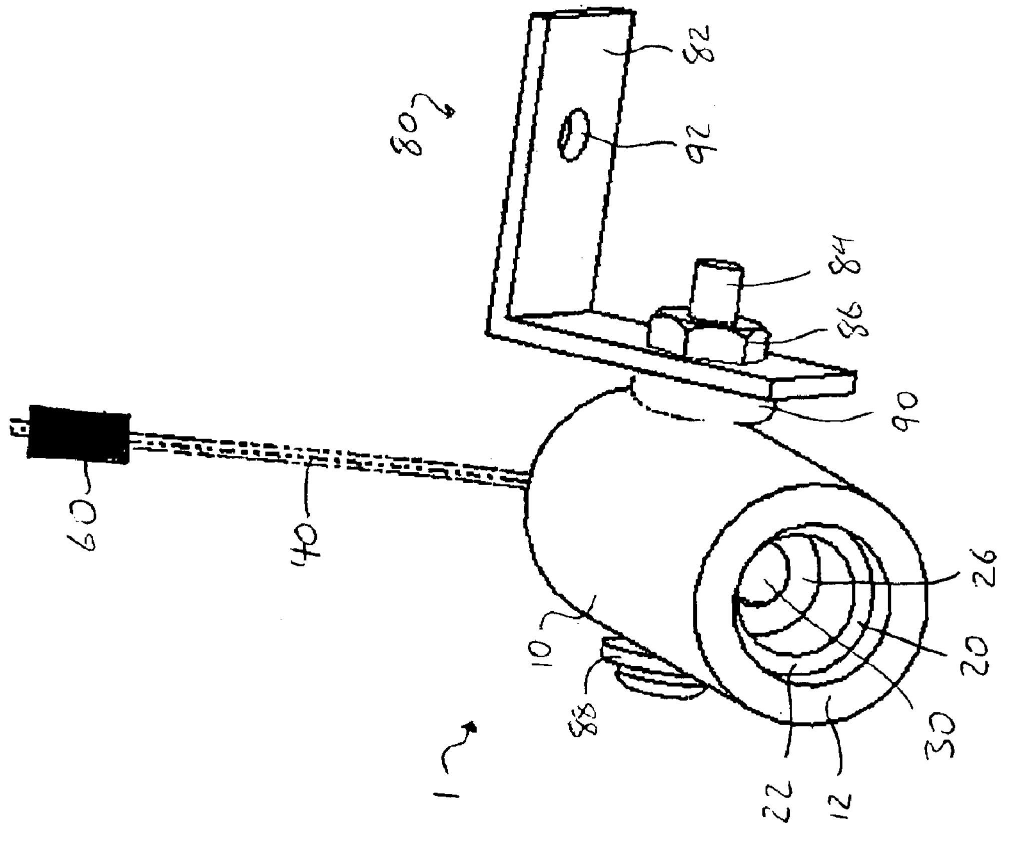
FIG. 1 is a front perspective view of a lighting fixture of the present lighting system.
Figure 2:
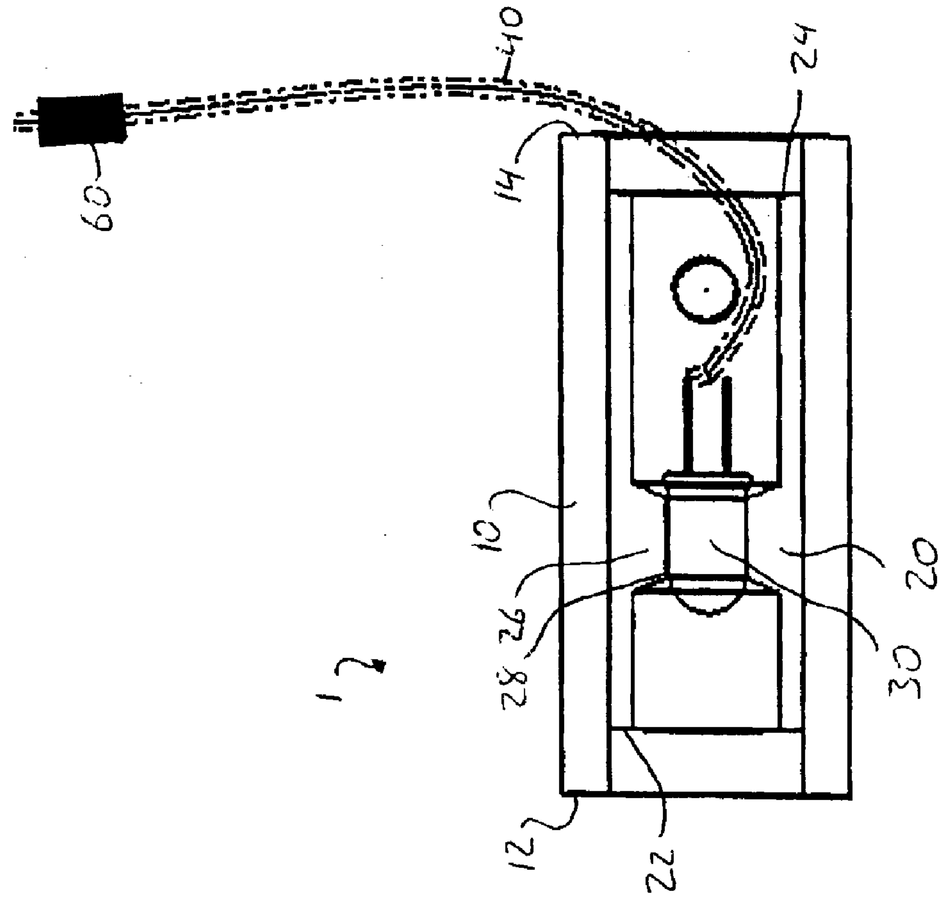
FIG. 2 is cross-sectional view of the lighting fixture of FIG. 1.
Figure 3:
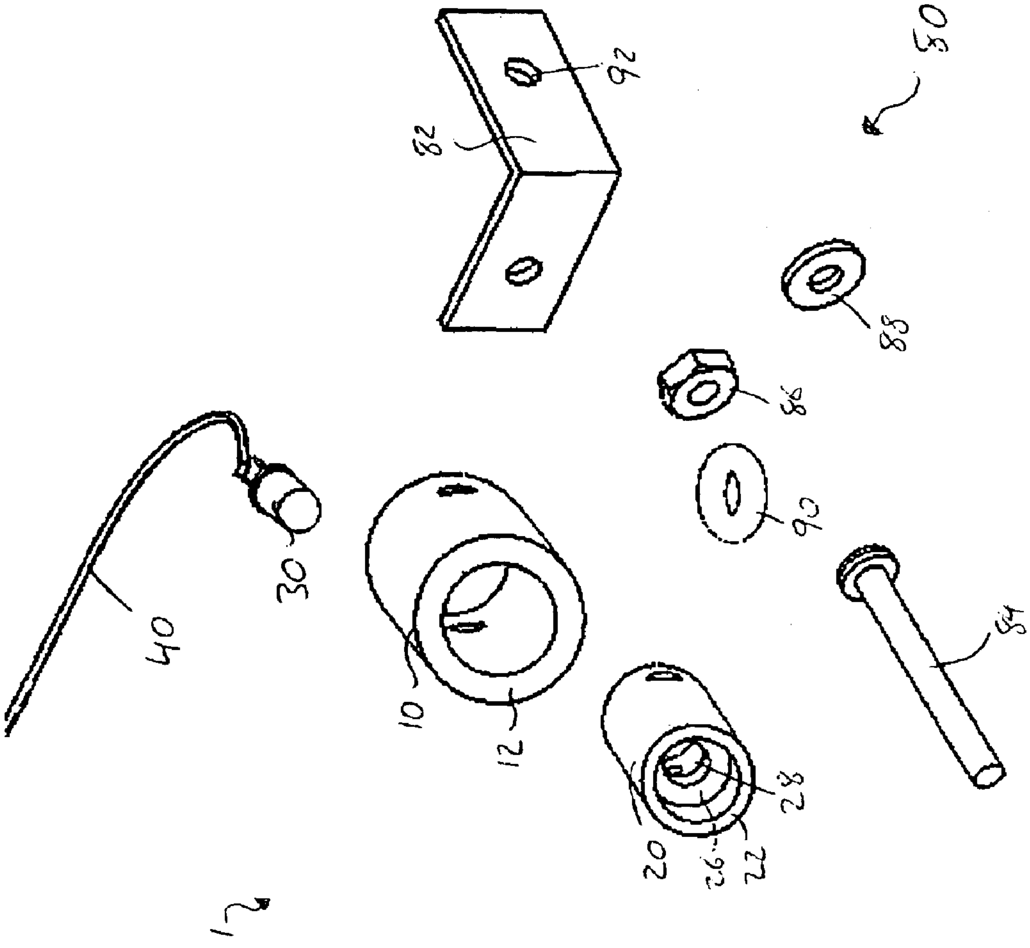
FIG. 3 is an exploded view of the lighting fixture of FIG. 1.

Reference is now made to the drawings. FIGS. 1 to 3 show a fixture 1 of the present invention. Fixture 1 is adapted to be hung from a soffit, ceiling or wall of a building and to be concealed both during the day and at night.

While fixture 1 can be used indoors, fixture 1 is primarily adapted to be used outdoors. Fixture 1 is therefore comprised of durable materials that can withstand the extremes of being in an outdoor environment, as described below.

Fixture 1 includes an outer shroud 10 which presents the external face of fixture 1. Outer shroud 10 is preferably comprised of plastic, and in particular is chosen from plastics that have a durability of over 20 years in an external environment. Such plastics are adapted for both extreme cold and heat, and are resistant to ultra-violet (UV) radiation. One suitable plastic used by the inventor is made by Cyro Industries under the name Acrylite®.

Outer shroud 10 is preferably a hollow cylindrical shape, although other shapes may be used.

In operation, the color of outer shroud 10 is preferably chosen to match the soffit, wall or ceiling color on which fixture 1 is being mounted. This color matching, along with the small size of outer shroud 10 allows fixture 1 to be camouflaged against the soffit, making it difficult to see during the day.

One problem with outer shroud 10 is that plastics that are durable and UV resistant are not completely opaque. These plastics in fact are somewhat translucent, and conduct light when a portion of the outer shroud 10 is illuminated from the inside. In order to overcome this disadvantage fixture 1 further includes an inner shroud 20.

Inner shroud 20 is preferably comprised of a dark, light absorbing plastic that is adapted to concentrically abut the inner surface of outer shroud 10. A tight fit and/or the use of various possible sealing techniques minimizes the possibility of water seeping between the two surfaces and freezing, thus causing damage to inner shroud 20 or outer shroud 10. These sealing techniques can further hold inner shroud 20 within outer shroud 10. Alternatively, a set screw may be introduced between inner shroud 20 and outer shroud 10 to hold inner shroud 20 in a proper position.

As shown in FIGS. 1 and 2, when installed the front edge 22 of inner shroud 20 is offset back from the front edge 12 of outer shroud 10. This configuration presents several advantages. By using a light absorbing dark plastic material outer shroud 10 will not be illuminated, thus preventing outer shroud 10 from glowing. This makes fixture 1 more difficult to see at night, creating a better aesthetic impression.

Moreover, if inner shroud front edge 22 extended to the front edge 12 of outer shroud 10 it would be visible during the day. The dark color of inner shroud 20 would then be highlighted by a lighter colored outer shroud 10, producing an undesired visibility. By offsetting front edge 22 of inner shroud 20 from front edge 12 the visibility of inner shroud 20 is reduced.

An additional advantage of using a plastic inner shroud 20 is that the thickness of the inner shroud 20 protects outer shroud 10 from being illuminated. Since inner shroud 20 is offset from front edge 12 of outer shroud 10, the possibility exists that a light source would still illuminate front edge 12, making fixture 1 more visible at night. This is clearly undesirable. The thickness of plastic in inner shroud 20 is chosen along with the angle of incidence of the light, resulting in the exposed inner surface of front edge 12 being principally in the shadow of inner shroud 20, minimizing illumination of the front edge 12 of inner shroud 20.

In fixture 1, the rear edge 24 of inner shroud 20 is preferably spaced from the inner rear surface 14 of the outer shroud 14. This provides an area into which a high quality exterior grade sealant such as silicon can be injected, allowing superior moisture sealing. One such sealant is GE Silicone II™.

Inner shroud 20 is further provided with a lip 26 which projects inwardly from inner shroud 20 and is preferably located at point forward of the midpoint between rear edge 24 and front edge 22 of inner shroud 20. Inner bore 28 of lip 26 is adapted to receive a light source.

The light source 30 of the present invention is preferably a light emitting diode (LED). The advantage of this type of light source is its efficiency, life and low heat properties. The use of a plastic inner shroud 20 necessitates that a low heat light source be used. Further, light emitting diodes have a life which can exceed one hundred thousand hours before they need to be replaced. This is advantageous for installations in which fixture 1 is affixed to a soffit or ceiling where replacement of light bulbs would be a difficult and potentially dangerous exercise.

The efficiency of an LED source 30 is also advantageous. The power consumption of a light emitting diode is significantly lower than that of an incandescent bulb. For an application such as exterior lighting where the lights will be on for a significant time period each day, the lower cost of operating these lights is an advantage.

A further advantage of light emitting diodes is that they provide a saturated color. This is advantageous over incandescent or halogen systems in which a colored lens is placed over the light in order to change the color of the light. This merely filters the light leading to light loss and heat build-up in the light housing.

LEDs are well known in the art. They come in a variety of colors, allowing light source 30 to be customized to create a different artistic effect than with only white light which most incandescent bulbs are restricted to. LEDs further can be selected for a particular brightness.

In fixture 1, light source 30 rests within and concentrically to bore 28. An outer flange on lights source 30 abuts ring 26, ensuring proper positioning of light source 30. Light source 30 is held in place by an adhesive such as GE Silicone II™.

Cable 40 includes a supply and ground wire, thus proving power to light source 30. Cable 40 enters outer shroud 10 through an opening in its rear edge 14 and enters inner shroud 20 through its rear opening.

By placing a current limiting resistor 60 along wire 40 rather than within fixture 1, a series of fixtures can be placed in series, reducing the total number of resistors in the system and providing further power efficiency.

The configuration of fixture 1 provides a lighting source that, based on the strength of the LED, is recommended for a brightness which is several time brighter than moonlight at ground level from typical projection heights on the soffits of buildings. If a brighter configuration is desired the heat of light source 30 might reduce the life span of light source 30. Therefore, for brighter configurations, several further components can be added. Reference is now made to FIGS. 4 to 9.

Figure 4:
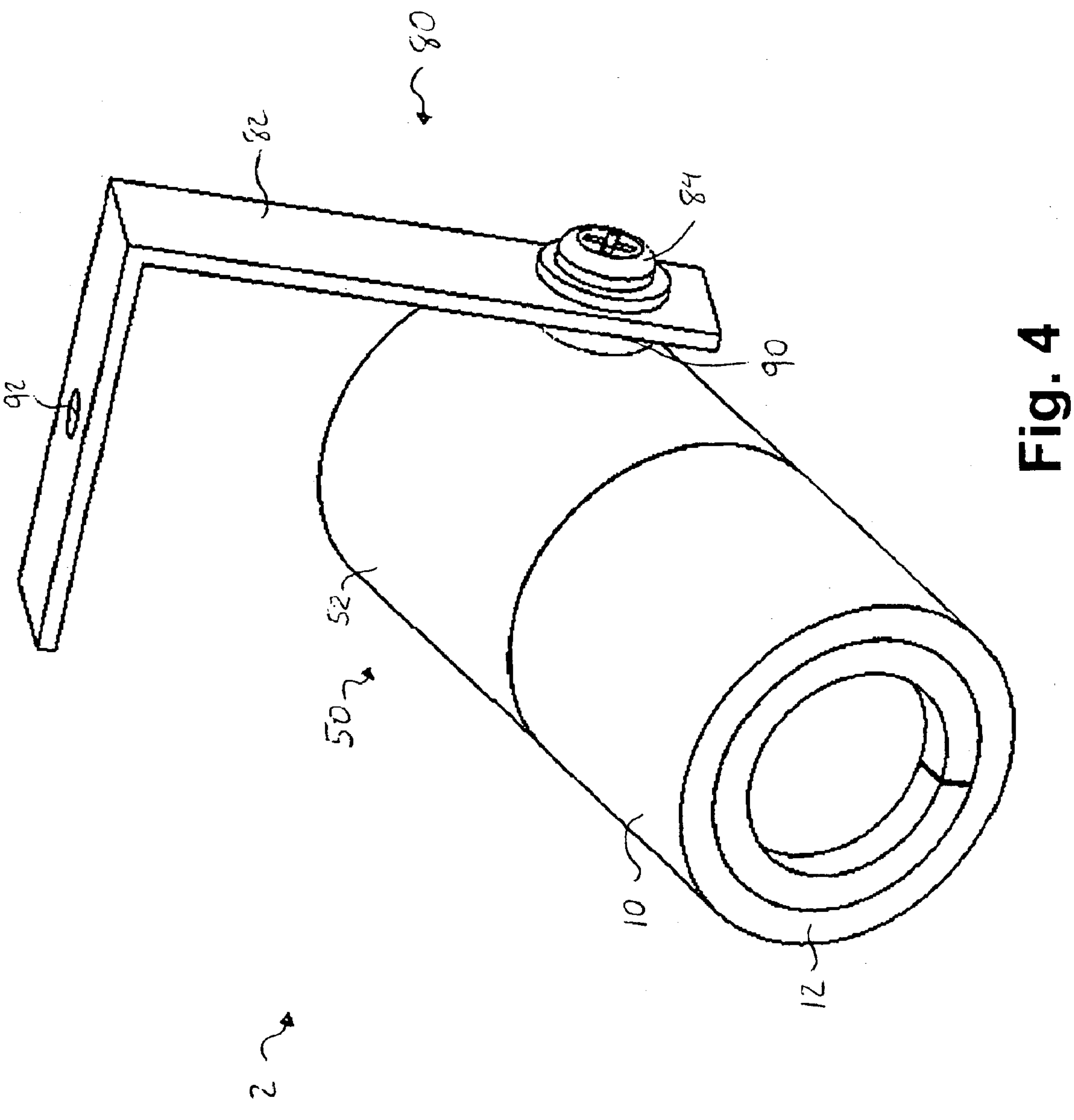
FIG. 4 is a front perspective view of an alternate lighting fixture of the present lighting system.
Figure 5:
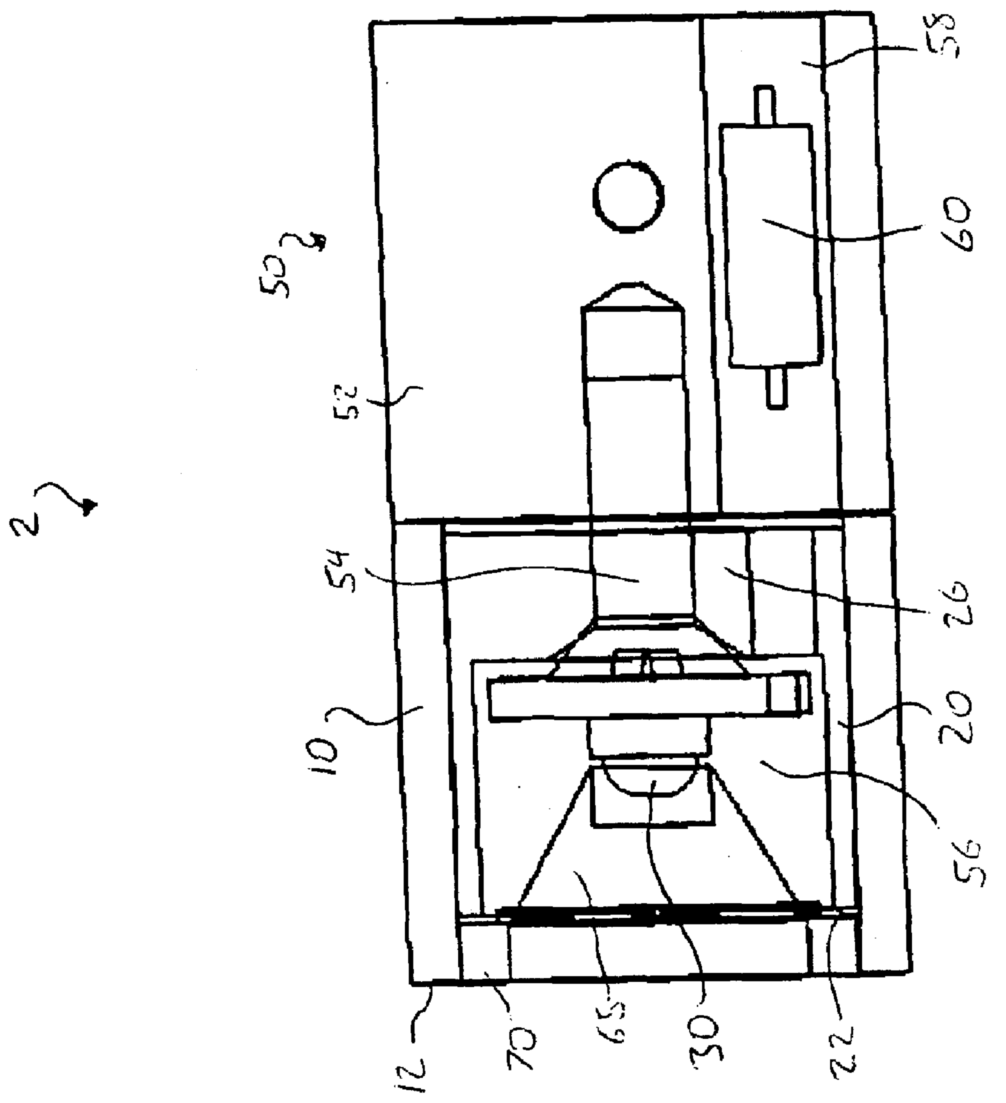
FIG. 5 is cross-sectional view of the lighting fixture of FIG. 4.
Figure 6:
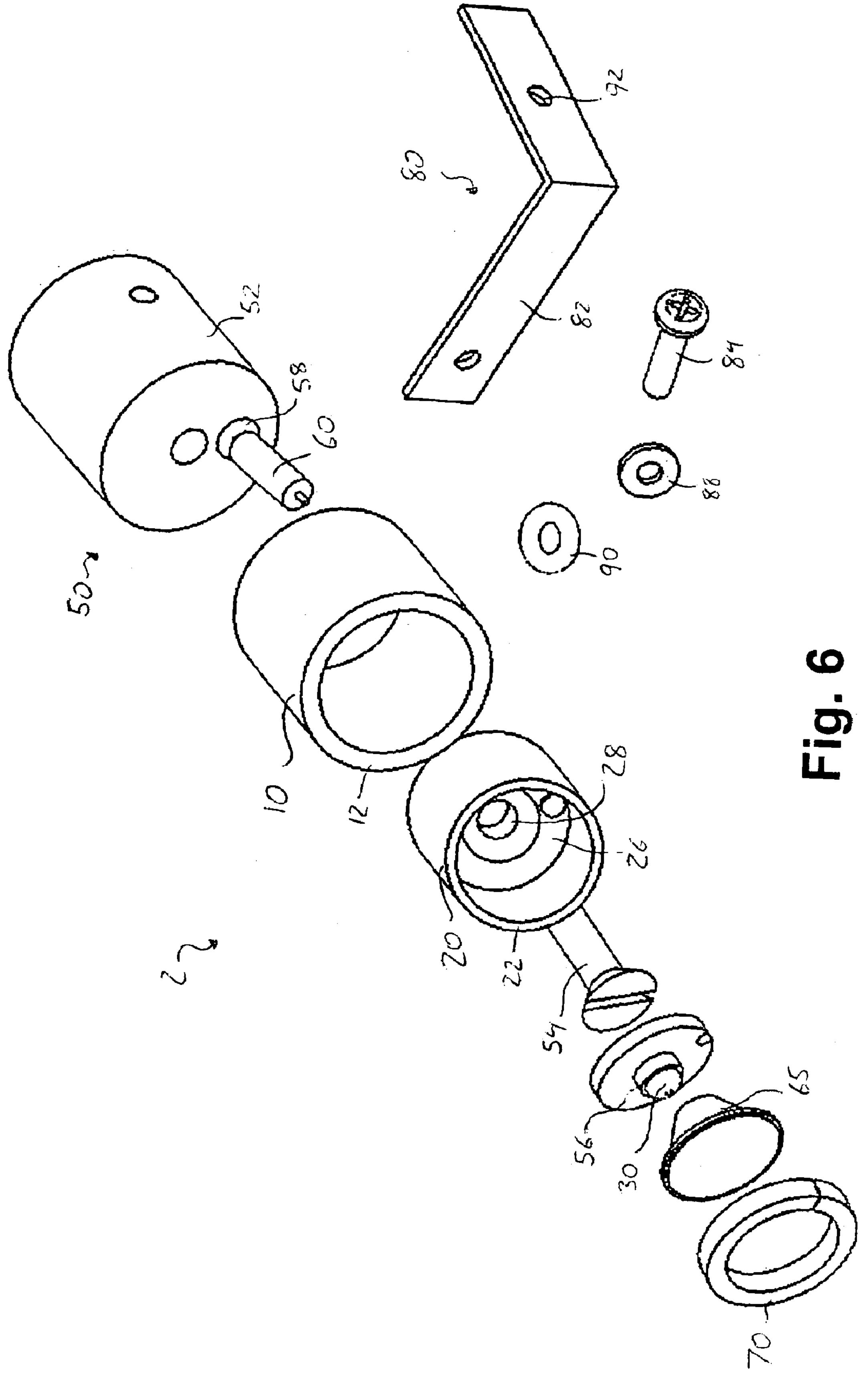
FIG. 6 is an exploded view of the lighting fixture of FIG. 4.

FIGS. 4 to 6 illustrate fixture 2. Fixture 2 is an alternative configuration in which light source 30 can be a higher powered and thus brighter light emitting diode. Various similar components between fixture 1 and 2, such as outer shroud 10 and inner shroud 20 have been similarly numbered.

In order to accommodate a higher power light source, a heat dissipation system 50 can be added to fixture 2. This allows the life of light source 30 to be extended by ensuring that the heat generated by the light source is dissipated.

Heat dissipation system 50 includes a heat sink 52 that can be mounted to the back of outer shroud 10. Heat sinks are well known in the art. Heat sink 52 preferably includes several square inches of exposed surface area for convection cooling. Preferably, one such heat sink is made from an aluminum rod whose outer diameter corresponds with the outer diameter of outer shroud 10.

Connected between heat sink 52 and inner shroud 20 in fixture 2 is a bolt 54. Bolt 54 serves the dual purpose of attaching heat sink 52 to fixture 2 and as a heat conduit to dissipate heat from light source 30.

Light source 30, in the heat dissipating embodiment of the present invention, is enclosed within heat spreader 56. Heat spreader 56 allows the dissipation of heat by surrounding the lower portion of light source 30 with a heat conductive layer.

The above configuration thus allows the use of a higher power light source while eliminating some of the drawbacks of such a light source. Specifically heat, which might shorten the life of a light emitting diode, is channelled away from the light source 30 using heat dissipating elements 50.

In all fixtures, a resistor 60 is further included along cable 40 in series with the light source to limit the current to the light source. More than one fixture may be placed in series electrically speaking to conserve power. In all configurations a current limiting device such as resistor 60 is used to set proper bias for the LED device or devices as in the case of a series arrangement.

Design should be done such that the current limiting device does not raise the temperature of the LED to the point of compromising LED life or restricting the brightness of the LED. A resistor may be placed outside the fixture mid-span with the cable 40, as shown in FIG. 1, or at the end of the cable 40 where it joins the main feed cable. This removes the undesirable heat from the LED completely which is highly desirable but may result in additional effort and cost for assembly and installation. Also, in the case of higher powered LEDs with higher bias currents, resistors can be in close proximity to the insulation of the electrical wires and can result in a local ambient temperature that is over the specification of the wire's insulation rating.

One alternative for low powered LEDs is to place the resistor within the fixture, as in the cavity of the inner shroud 20 on the lead side of light source 30. In this configuration, additional thermal relief and moisture resistance is achieved by means of a sealant that can fill this cavity in assembly.

Figure 7:
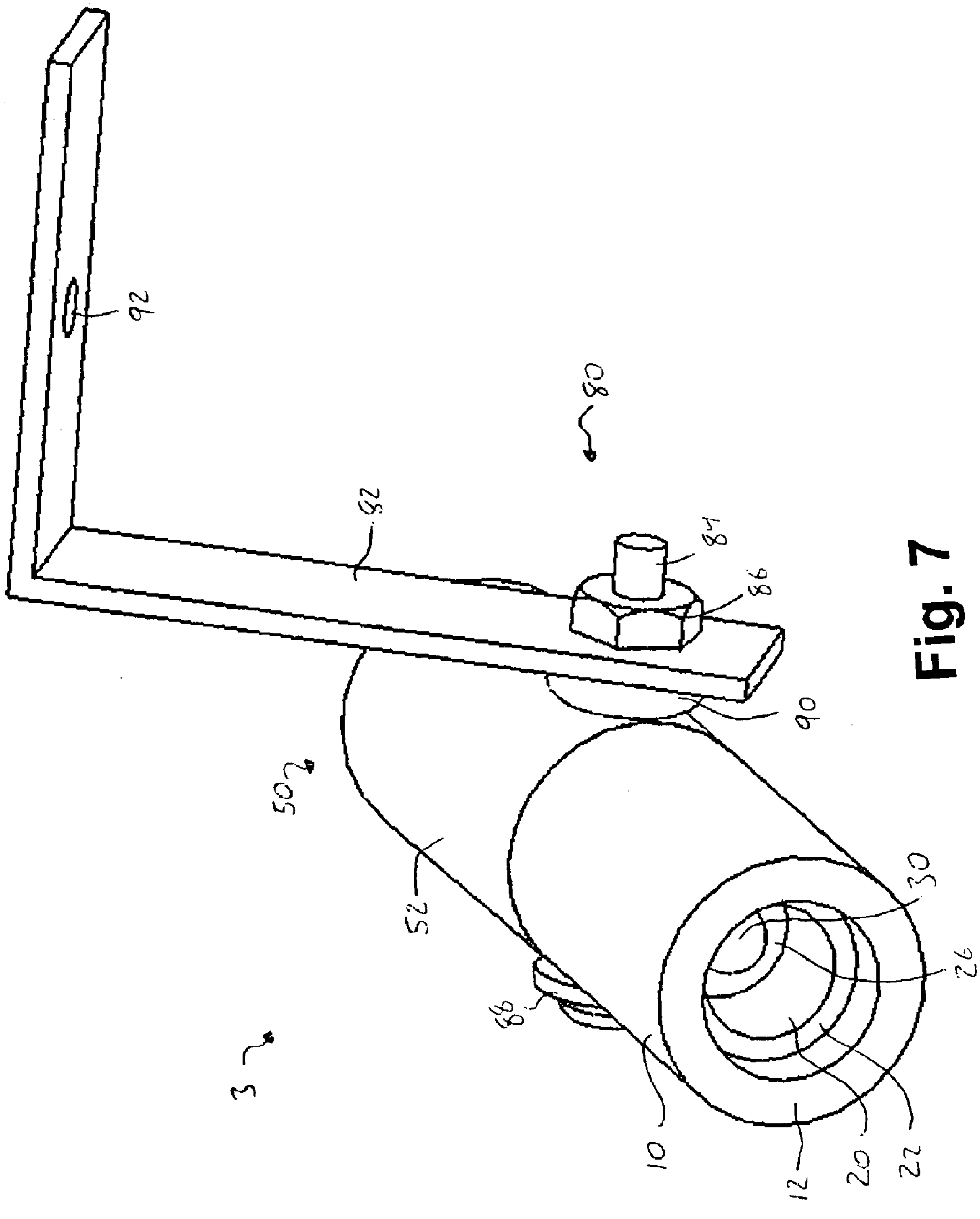
FIG. 7 is a front perspective view of a further lighting fixture of the present lighting system.
Figure 8:
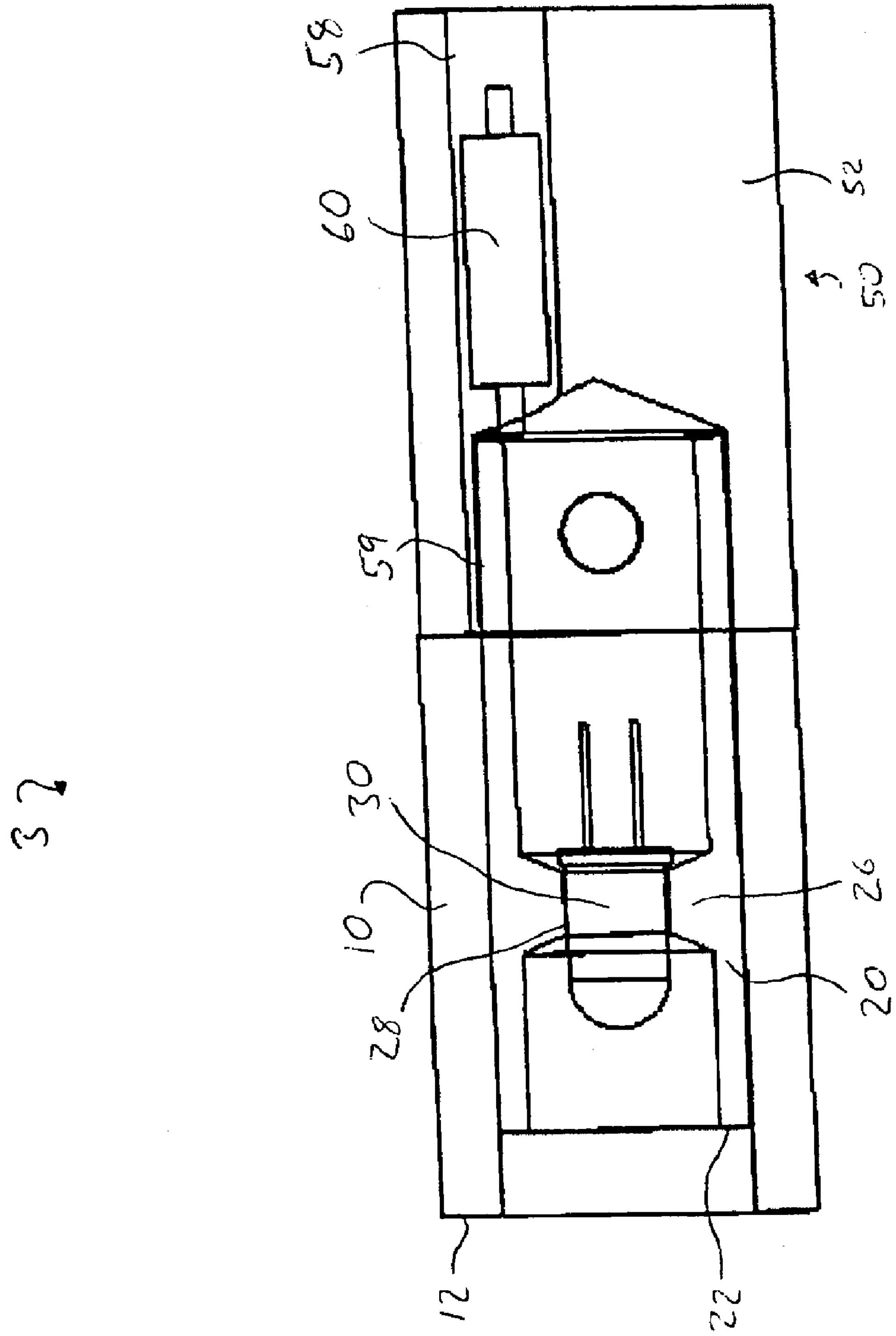
FIG. 8 is cross-sectional view of the lighting fixture of FIG. 7.
Figure 9:
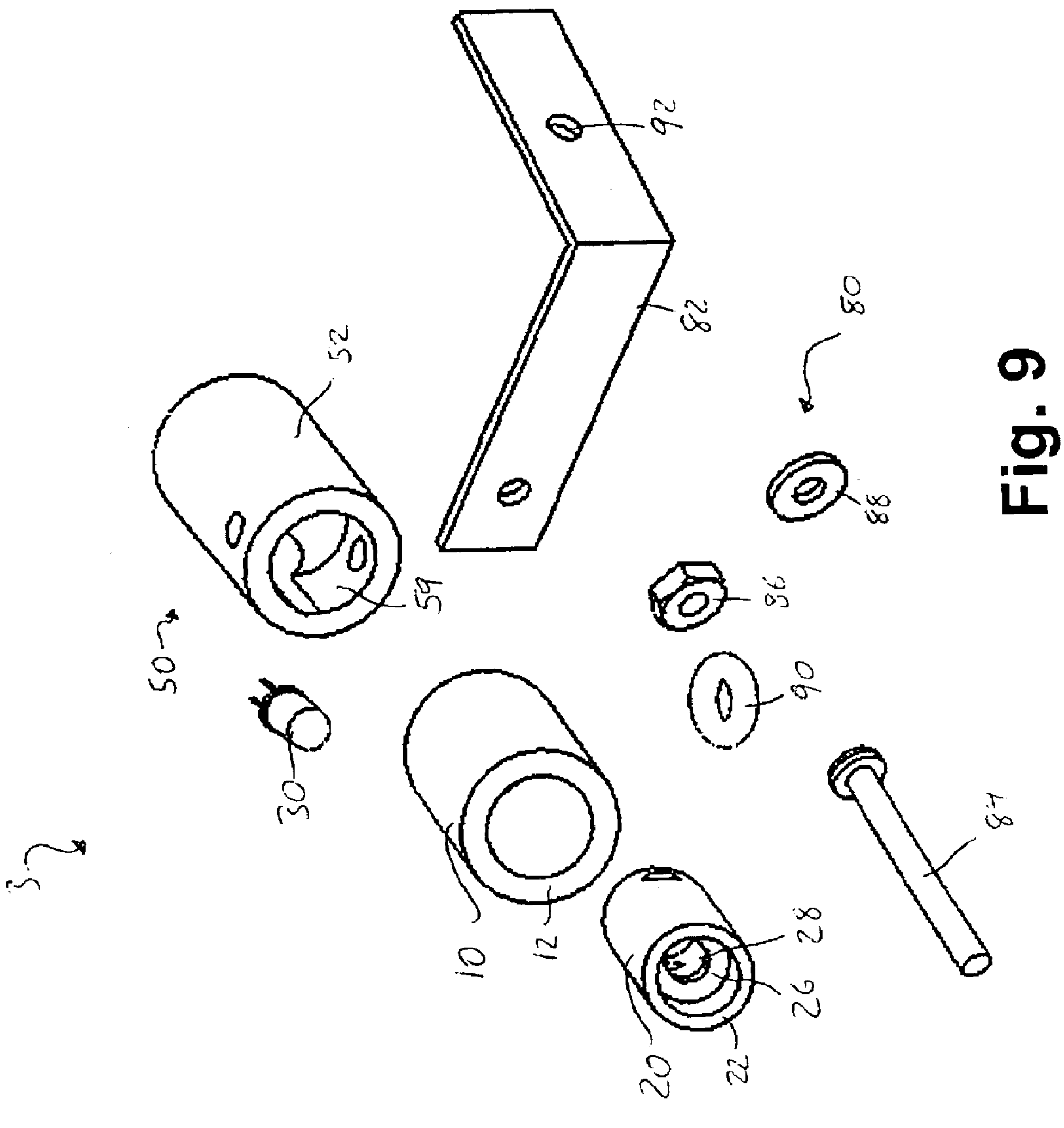
FIG. 9 is an exploded view of the lighting fixture of FIG. 7.

If the above alternate heat dissipation method is not adequate, a heat sink 52 as in fixture 2 or in fixture 3, shown in FIGS. 7 to 9, can be used to provide the necessary thermal dissipation. In the case of the higher powered LEDs, a heat sink with integral current limiting device (a preferred choice being the resistor 60) is always used as shown in fixture 2. Heat sink 52 preferably includes a channel 58 to provide a heat dissipating mount for resistor 60.

Fixture 3, shown in FIGS. 7 to 9, may be used as a cosmetically consistent alternative to fixture 1 when used along side of fixture 2. This utilization may occur even if the current limiting resistor could have adequately been placed in fixture 1 without creating enough heat to be of concern.

In fixture 3, heat sink 52 includes a bore 59. Inner shroud 59 fits within this bore and can be held in place by bonding or mechanical means. Outer shroud 10 fits over inner shroud 20 and the back of outer shroud 10 abuts heat sink 52. A set screw may be used to hold outer shroud 10 in place. Also, the gap between outer shroud 10 and heat sink 52 can be sealed using a sealant or a gasket or o-ring.

A further element that can be added to any of the fixtures of the present invention is a lens to provide focussing and reduced light loss, as shown in FIGS. 4 to 6. Light is emitted from an LED within a specified angle range based on the shape of the LED. When only the internal shroud 20 is used, light which is directed into this internal shroud is lost. If further brightness is required, a lens 65 can be affixed over the light source 30. This ensures that more light that is directed towards the side walls of fixture 1 is redirected towards the intended target, ensuring brighter illumination. However, some light is still lost, even with a lens, necessitating the inner shroud remain even for this configuration.

Lens 65 is held in place using lens collar 70. Lens collar 70 is made from the same material as outer shroud 10 and is adapted to fit concentrically within the end of outer shroud 10. The use of lens 65 and lens collar 70 remove some of the camouflaged nature of fixture 1 at night due to the glow created in lens collar 70, but substitute this for brighter illumination.

Various fronts can be placed within the center of lens collar 70. These include flat glass to reduce exposure to insects and moisture. Diffusers can also be used in an attempt to more evenly distribute light rather than having a central bright spot.

In application, fixtures 1, 2 or 3 are affixed to a soffit, wall or ceiling using a mounting mechanism 80 that allows the fixture to be pointed in any direction. Mounting mechanism 80 is preferably adapted to hold the position of the fixture through various adverse weather conditions without moving, but is also capable of being adjusted easily.

In a preferred embodiment, mounting mechanism 80 comprises a bracket 82. Bracket 82 preferably has a right angled bend in it, and can be comprised of any suitable rigid material, including aluminum or plastic.

Bracket 82 is affixed to fixture 1, 2 or 3 through a hinge, which allows pivoting of the fixture. Preferably the hinge comprises a bolt 84. Bolt 84 is preferably held in place by nut 86, as in fixtures 1 and 3, or by threading in heat sink 52, as in fixture 2. Bolt 84 can further serve to hold heat sink 52 to inner shroud 20 in fixture 3, as seen in FIGS. 6 to 9.

In order to allow rotation, a washer 88 is further added at one end and a resilient "O" ring 90 is added at the other end of fixture 1. Resilient "O" ring 90 must be durable but provide sufficient frictional grip to prevent fixture 1 from moving once it is in the correct position. The advantage of "O" ring 90 is that finer adjustments are possible than by using a detent system. In decorative lighting applications fractions of a degree can be important and make a difference.

Bracket 82 is further mounted to the soffit, wall or ceiling using an affixing means such as a screw. Hole 92 is used for this mounting purpose.

Power is supplied to fixture 1 through a power cable. In a preferable embodiment, a timing and power converting unit is located within the building being lit. The timing unit can be used to program when the lights turn on. This can further be supplemented with light level sensors or other means which are known in the art.

The power converting unit generally converts the AC power supplied to the building to a DC voltage to be supplied to light source 30. Alternatives include solar charging of batteries to supply power to light source 30.

In operation, a series of fixtures can be affixed along a soffit of a building, each pointing at a specific element of the landscaping or architecture that the user wishes to highlight. Artistic elements can be enhanced through the use of varied brightness or color. A single cable runs from the power converting unit along the soffit of the house. This cable preferably is the same color as the surrounding soffit material or other background building material and has weather resistant insulation.

Various connector schemes as well as permanent soldered and sealed connections are preferably found along the cable to allow wires 40 to be affixed to the common cable, thus providing power to fixtures 1, 2 or 3.

The above-described embodiments of the present invention are meant to be illustrative of preferred embodiments and are not intended to limit the scope of the present invention. Also, various modifications, which would be readily apparent to one skilled in the art, are intended to be within the scope of the present invention. The only limitations to the scope of the present invention are set forth in the following claims appended hereto.

I claim:

1. A housing for an light source, said housing comprising:

an outer shroud, said outer shroud including an outer surface, a front edge, and a hollow inner surface; and an inner shroud, said inner shroud including a front edge and a concentric bore, the light source being affixed within the concentric bore rearwardly of the front surface of the inner shroud, said inner shroud fitting concentrically within said inner surface of said outer shroud and said front edge of said inner shroud being offset back from the front edge of said outer shroud;

wherein the inner shroud shades said front edge of said outer shroud from said light source.

2. The housing of claim 1 wherein the inner shroud is non-reflective and non-transmissive.

3. The housing of claim 1, wherein the light source is a light emitting diode.

4. The housing of claim 1 wherein said outer shroud is comprised of a UV resistant plastic.

5. The housing of claim 1 further comprising a heat sink, said heat sink being affixed over the rear side of said inner shroud.

6. The housing of claim 5, wherein the heat sink includes a channel within which a current limiting device is installed.

7. The housing of claim 6 further comprising a sealant to seal said channel in said heat sink and provide better thermal conduction after said current limiting device is placed in said channel.

8. The housing of claim 1 further comprising a mounting means.

9. The housing of claim 8, wherein said mounting means comprises:

an angled bracket;

an affixing means to affix a first end of said angled bracket to said building;

a pivotal attachment means for pivotally attaching said housing to a second end of said angled bracket; and a holding means affixed to said pivotal means, said holding means allowing manual pivoting of said housing but holding said housing in a fixed position absent manual pivoting.

10. The housing of claim 9, wherein said holding means comprises a resilient "o" ring.

11. The housing of claim 1 further comprising a lens, said lens being affixed to said housing in front of said light emitting diode.

12. A light fixture comprising: a housing, the housing comprising an outer shroud having a front surface and a concentric bore, and an inner shroud having a front surface and mounted within the concentric bore with the front surface of the inner shroud being rearward of the front surface of the outer shroud;

a light emitting diode affixed within said housing rearwardly of the front surface of the inner shroud;

a power input for providing power to said light emitting diode;

a current limiting device located between said power input and said light emitting diode; and a heat dissipation device affixed to said housing, said current limiting device being located within said heat dissipation device, wherein the inner shroud shield the front surface of the outer shroud from light from said light-emitting diode.

13. The light fixture of claim 12, wherein said power input is a direct current input.

14. The light fixture of claim 13, wherein said current limiting device is a resistor.

15. The light fixture of claim 14, wherein said resistor is placed within a hole formed for said resistor in said heat dissipation device.

16. The light fixture of claim 15 further comprising a sealant to seal said hole in said heat dissipation device and provide better thermal conduction after said resistor is placed in said hole.

17. The light fixture of claim 16 further comprising a mounting means to mount said light fixture to a structure.

18. The light fixture of claim 17, wherein said mounting means is an angled bracket affixed to said heat dissipation device.

19. The fixture of claim 12 further comprising a lens, said lens being affixed to said housing in front of said light emitting diode.

* * * * *